United States Patent [19]

De Ceuster et al.

[11] 4,390,395

[45] Jun. 28, 1983

[54] PROCESS FOR THE REGENERATION OF WASTE PAPER

[75] Inventors: Jean De Ceuster, Vilvoorde; Georges Papageorges, Rixensart, both of Belgium

[73] Assignee: Interox, Brussels, Belgium

[21] Appl. No.: 276,467

[22] Filed: Jun. 23, 1981

Related U.S. Application Data

[63] Continuation of Ser. No. 841,994, Oct. 13, 1977, abandoned.

[30] Foreign Application Priority Data

Oct. 15, 1976 [LU] Luxembourg .......................... 76021

[51] Int. Cl.³ ............................................... D21C 5/02
[52] U.S. Cl. ........................................ 162/5; 162/6; 162/7; 162/8
[58] Field of Search ............................ 162/4, 5, 6, 8, 7

[56] References Cited

U.S. PATENT DOCUMENTS

| | | | |
|---|---|---|---|
| 2,077,059 | 4/1937 | Snyder et al. | 162/5 |
| 3,248,277 | 4/1966 | Gartner | 162/5 |
| 3,867,246 | 2/1975 | Hebbel et al. | 162/70 |

FOREIGN PATENT DOCUMENTS

| | | | |
|---|---|---|---|
| 817678 | 1/1975 | Belgium . | |
| 1331843 | 5/1963 | France . | |
| 49-37721 | 10/1974 | Japan | 162/6 |

*Primary Examiner*—William F. Smith
*Attorney, Agent, or Firm*—Spencer & Kaye

[57] ABSTRACT

The dry waste paper is directly fed in a disintegrator, functioning with a pulp consistency, at the disintegrator outlet, of between 20 and 50%, where it is disintegrated in the presence of an aqueous phase and at least one bleaching agent.

33 Claims, 1 Drawing Figure

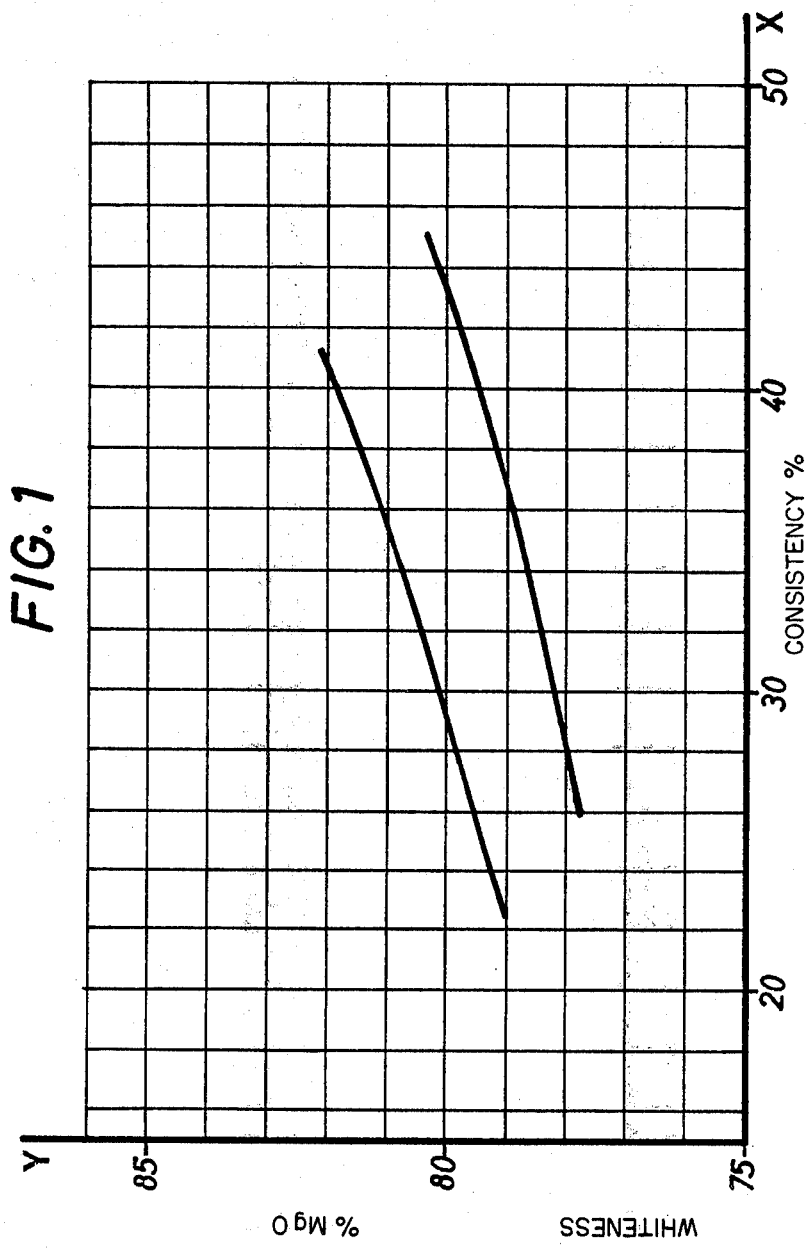

PROCESS FOR THE REGENERATION OF WASTE PAPER

CROSS REFERENCE TO RELATED APPLICATION

This application is a continuation of Application Ser. No. 841,994, filed Oct. 13th, 1977 now abandoned.

The present invention relates to a process for the regeneration of waste paper.

Recovered waste paper constitutes an important source of raw material for the papermaking industry, especially for the manufacture of papers and of board for packaging. Given that the degree of use of recovered fibres in packaging products is already very high, other outlets for waste paper have also been envisaged, such as the manufacture of printing and writing paper or the manufacture of "tissue" paper. In this case, it is important to have available a starting pulp which has a sufficient degree of whiteness. This degree of whiteness can be achieved by resorting to so-called deinking or bleaching techniques which especially comprise a stage of disintegrating the waste paper in a pulper. Other stages (vat storage, removal of heavy and light impurities, breaking down of agglomerates, and removal of the inks by washing or flotation) are in general also included in the treatment cycle.

Thus, it has been proposed to disintegrate the waste paper in disintegrators which function with high pulp consistencies. This operation only permits grinding and the pulps obtained must be subjected to subsequent chemical treatments in order to improve the release of the inks and/or to ensure that bleaching takes place. In order to improve the release of the inks in the disintegrator, it has been proposed to introduce basic deinking reactants into the disintegrator at the same time as the waste paper (French Patent No. 790,280 filed on 20.5.1935 by SNYDER MACLAREN PROCESSES INC.). In that case, considerable degradation of the fibres was observed, due to the conjoint effect of the base and of the increase in temperature usually observed in high consistency disintegrators.

In order to ensure that grinding, release of the inks and bleaching take place simultaneously, it has been proposed to use pulpers operating with lower pulp consistencies, not exceeding 8%, and to introduce into these at least one alkali and at least one peroxidic compound. These processes, which are generally effective, suffer from the disadvantage of requiring large amounts of reactants. Furthermore, they are not applicable to all types of paper. Thus, they do not permit sufficient grinding of papers which have a wet strength which has been increased by the incorporation of resins ("wet-strength" papers).

The Applicant Company has now found a process which does not suffer from the disadvantages mentioned above.

Accordingly, the present invention relates to a process for the regeneration of waste paper which comprises the disintegration of the waste paper in a disintegrator directly fed with dry waste paper and functioning with a pulp consistency, at the disintegrator outlet, of between 20 and 50%, in the presence of an aqueous phase, characterised in that at least one bleaching agent is introduced into the disintegrator at the same time.

By disintegrator there is understood an apparatus suitable for the disintegration of waste paper and fed directly with waste paper and an aqueous phase. The aqueous phase introduced into the disintegrator can be either in the form of steam or in a liquid form or simultaneously in each of these two forms. The disintegrators usable for the process according to the invention are disintegrators which operate with high pulp consistencies at the disintegrator outlet, the consistencies being between 20 and 50%, more particularly between 22 and 45% and preferably between 25 and 40%. Various disintegrators of this type can be used. However, it is preferred to use disintegrators, also sometimes called "pulpers," which comprise a case carrying fixed fingers, in which case rotate one or two shafts equipped with arms, such as for example, disintegrators of the LANNOYE type or of the WURSTER type or similar apparatuses based on the same principle. These apparatuses are fed directly with waste paper, which may have been chopped up beforehand, and with an aqueous phase as well as with at least one bleaching agent according to the process of the invention.

The bleaching agent can be a compound chosen from amongst the oxidising agents such as the peroxidic compounds and the reducing agents such as the alkali metal borohydrides and the alkali metal, zinc and ammonium dithionates. The bleaching agent is preferably a peroxidic compound. Various types of peroxidic compounds can be used. In general, inorganic peroxidic compounds such as, for example, sodium peroxide or hydrogen peroxide are used. The use of hydrogen peroxide is advantageous. The concentration of bleaching agent is in general between 0.05 and 6% and preferably between 0.1 and 5% by weight of the weight of the dry waste paper. The bleaching agent can be introduced into the disintegrator, either as such or in any other form such as an aqueous solution.

Advantageously, at least one alkaline compound can also be introduced into the disintegrator. The alkaline compound is chosen from amongst the compounds capable of giving an alkaline pH. These include, in particular, the hydroxides, the carbonates and the silicates of alkali metals such as, for example, sodium and potassium. Sodium hydroxide is particularly suitable. It is generally used by itself or mixed with at least one compound chosen from amongst sodium carbonate and sodium silicate. The total concentration of alkaline compounds is in general between 0.2 and 12% by weight of the total weight of the dry waste paper. If sodium hydroxide is used, its concentration is in general between 0.1 and 8% and preferably 0.2 and 5% by weight of the total weight of the dry waste paper. If at the same time either sodium carbonate or sodium silicate or both compounds are used, the concentration of these compounds is in general between 0.1 and 10% and preferably between 0.2 and 8% by weight of the total weight of the dry waste paper.

One or more carboxylic polymers can also advantageously be introduced into the disintegrator. These carboxylic polymers are polymers containing a main carbon chain substituted by carboxyl groups —COOM, where M represents hydrogen, an atom of an alkali metal or an ammonium group. Most frequently, M represents a hydrogen atom, a sodium or potassium atom or an ammonium group. Preferably, M represents a sodium atom.

The carboxlic polymers which can be used in the process according to the invention must not contain other substituents than the carboxyl groups. They can in particular be chosen from amongst the homopolymers or copolymers of acrylic acid or maleic acid.

The carboxylic polymers which can be used in the process according to the invention can also advantageously be substituted by one or more other substituents such as, for example, halogen atoms, hydroxyl groups, alkyl chains which may or may not be substituted by hydroxyl groups or by halogens, or aryl, aralkyl or cycloalkyl groups which may or may not be substituted by hydroxyl groups or by halogens.

Amongst all the carboxylic polymers which can be used in the process according to the invention, the hydroxycarboxylic polymers are particularly suitable. As examples of such polymers there may be mentioned the polyhydroxycarboxylates described in German patent application No. 1,904,940 filed on 1.2.1969 in the name of DEGUSSA.

Particularly suitable hydroxycarboxylic polymers are those which contain monomeric units of the formula

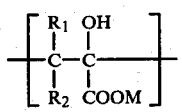

where $R_1$ and $R_2$ represent hydrogen or an alkyl group containing from 1 to 3 carbon atoms which can be substituted by a hydroxyl group or by a halogen atom, and $R_1$ and $R_2$ can be identical or different, and where M has the same meaning as above.

The polymers which can be used in the process according to the invention are preferably the polymers as defined above, in which $R_1$ and $R_2$ represent hydrogen or a methyl group, and can be identical or different. The best results are obtained with the polymers where $R_1$ and $R_2$ represent hydrogen.

The polymers which can be used in the process according to the present invention are chosen from amongst the homopolymers and the copolymers containing units as defined above, of the same type or of several different types. If copolymers are used, they are most frequently chosen from amongst those which contain at least 20% of units as defined above and preferably from amongst those which contain at least 50% of such units. The best results are obtained with the polymers which only contain units such as those defined above.

The copolymers which can be used include those which contain units derived from vinyl monomers substituted by groups chosen from amongst the hydroxyl and carboxyl groups. Advantageously, these copolymers contain acrylic units of the formula

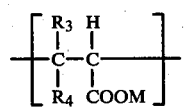

where $R_3$ and $R_4$ represent a hydrogen atom or an alkyl group containing from 1 to 3 carbon atoms, and where M has the same meaning as above. Amongst these copolymers, it is preferred to use those containing acrylic units derived from unsubstituted acrylic acid, where $R_3$ and $R_4$ represent hydrogen.

The mean molecular weight of the polymers employed is greater than about 300. In general, it is between 2,000 and 1,000,000. The best results are obtained when it is between about 5,000 and about 800,000.

The hydroxycarboxylic polymers which can be used in the process according to the invention can be employed in the form of salts of polyhydroxycarboxylic acids or in the form of polyhydroxycarboxylic acids. In this latter case, they can be employed in the form of the corresponding polylactones. The polylactones derived from the polyhydroxycarboxylic acids according to the invention are inter-molecular and/or intra-molecular esters obtained by reaction of the acid groups of the said polymers with the alcohol groups, it being possible for the said groups to be partially or completely lactonised. The degree of lactonisation of the group in question is in general between 30 and 100%.

Particularly suitable polymers are sodium poly-alpha-hydroxyacrylate and the polylactone derived from poly-alpha-hydroxyacrylic acid.

Mixtures of the abovementioned polymers with polyacrylic acid or with sodium polyacrylate are also very suitable.

Where carboxylic polymers are introduced into the disintegrator, their concentration is in general between 0.001 and 10% and preferably between 0.01 and 5% by weight of the weight of the dry waste paper.

It is also possible to introduce other additives such as, for example, collectors, foaming agents or dispersing agents, into the disintegrator.

However, the collectors are not essential if the aqueous solution used in the process of the invention contains carboxylic polymers.

The collectors most frequently used are fatty acids or mixtures of fatty acids. The collectors can be introduced at the rate of 0 to 5% by weight of the weight of the dry waste paper.

The foaming agents are surface-active agents and more particularly the anionic or non-ionic surface-active agents. A list of surface-active agents is given in the book "Surface Active Agents" by A. M. Schwarz and J. W. Perry. The foaming agents can be introduced at the rate of 0 to 2% by weight of the weight of the dry waste paper.

It is also possible to use products which at one and the same time possess the properties of foaming agents and of collectors, such as, for example, sodium or potassium soaps. The soaps can be introduced at the rate of 0 to 10% by weight of the weight of the dry waste paper.

The dispersing agents are most commonly anionic, cationic or non-ionic surface-active agents. These include, in particular, the alkyl or aryl sulphates, sulphonates and polyether-alcohols. They are generally introduced at the rate of 0 to 5% by weight of the weight of the dry waste paper.

All the additives introduced into the disintegrator can be introduced in any manner which is in itself known. They can be introduced independently, as such or in the form of aqueous solutions, suspensions or dispersions. They can also be introduced either partially or completely in the form of premixes. A convenient method of operation consists of preparing an aqueous solution containing the bleaching agent as well as the other possible additives which it is desired to employ. Other methods of working can of course also be used.

An example of an aqueous solution which is very suitable for carrying out the process according to the invention can advantageously contain from 0.05 to 6% and preferably from 0.1 to 5% by weight of hydrogen peroxide, from 0 to 8% and preferably from 0.2 to 5% by weight of sodium hydroxide, from 0 to 10% and preferably from 0 to 8% by weight of sodium silicate, from 0 to 10% and preferably from 0 to 5% by weight of carboxylic polymers and from 0 to 10% by weight of various additives relative to the weight of the dry waste paper. If the solution contains carboxylic polymers the content of sodium silicate can be greatly reduced, or the sodium silicate can even be omitted.

Excellent results are obtained by introducing into the disintegrator from 0.1 to 3% of hydrogen peroxide, from 0.2 to 2.5% of sodium hydroxide and from 0 to 8% of other additives which can advantageously include the carboxylic polymers, the percentages being relative to the weight of the dry waste paper.

The temperature at the outlet of the disintegrator is usually between 20° and 120° C. and preferably between 25° and 100° C. The pressure in the disintegrator can vary within wide limits. Thus, it is possible to work under atmospheric pressure or under steam pressure. The pressures are usually between 0.8 and 5 kg/cm$^2$. The residence time is usually between 10 seconds and 3 hours.

The process which forms the subject of the invention can be applied to various types of waste paper. It is possible to use papers produced from chemical, mechanochemical, thermo-mechanical or mechanical pulps. The process is particularly applicable to the regeneration of papers into which resins have been incorporated, especially with a view to increasing their wet strength. Such papers can contain from 0.01 to 10% by weight of resins. By resins there are understood, in general, condensation polymers such as, for example, the urea-formaldehyde resins, the melamine-formaldehyde resins, the polyamides, the polyamines, the resins based on epichlorohydrine and the polyethyleneimines. Examples of resins capable of increasing the wet strength of the papers are given in Tappi Monograph Series No. 29—Wet Strength in Paper and Board.

The disintegration in the disintegrator according to the process of the invention can be followed by other treatments and especially by a stage of removal of the inks by washing or by flotation.

When using the process according to the invention, excellent grinding of the waste paper was observed, even when the process was applied to papers containing resins to the extent of 0.01 to 10% of their weight. Furthermore, the inks are well removed from the paper support and can subsequently be very easily dispersed or removed during the washing or flotation stage. The final whiteness of the product is sufficient without it being essential to resort to additional bleaching stages. Furthermore, the consumption of reactants has proved to be remarkably low. In addition, the degradation of the fibres is hardly noticeable and this is so in spite of the relatively high temperatures at which the disintegrator operates.

The deinked paper pulp thus obtained is advantageously used in the manufacture of printing and writing paper.

The examples which follow were carried out by way of illustration and without implying a limitation, in order better to demonstrate the remarkable results obtained when applying the process according to the invention to the regeneration of waste paper.

EXAMPLES 1R TO 5

The tests were carried out in a disintegrator of the LANNOYE type functioniing with a high pulp consistency, on wood-free white old documents.

The paper is chopped up manually and is then introduced into the disintegrator at the rate of 500 kg/hour. Simultaneously, water at the rate of 600 l/hour is introduced in the form of steam (Experiments 1R, and 2 to 4) or in the liquid form (Experiment 5), and the reactants are introduced at the rates required to give the concentrations, in the medium, shown in Table 1 below. After ½ hour, the introduction of the paper, the water and the reactants is stopped and the mixture is triturated for ¼hour, Samples are taken in order to measure their whiteness.

The whiteness of the pulp is measured by means of an ELREPHO (ZEISS) reflectometer equipped with R 457 and FL 46 filters and is compared to that of MgO.

The temperature of the pulp on leaving the disintegrator is between 70° and 95° C.

The results obtained are summarised in Table 1 below. Exmperiment 1R was carried out by way of comparison in the absence of reactants. Exmperiments 2 to 5 were carried out in accordance with the invention. Experiment 5 was carried out in the presence of sodium poly-alpha-hydroxyacrylate.

TABLE 1

| Experiments | 1 R | 2 | 3 | 4 | 5 |
|---|---|---|---|---|---|
| Working conditions Additives, % of dry waste paper | | | | | |
| $H_2O_2$ | — | 1 | 1 | 1 | 1 |
| NaOH | — | 1.2 | 1.2 | 1.2 | 1.2 |
| Sodium poly-α-hydroxyacrylate | — | — | — | — | 0.65 |
| Pulp density, % | 57 | 44 | 36 | 28 | 36 |
| Whiteness, % MgO | 69.7 | 79.7 | 78.9 | 77.6 | 81.3 |

Examination of the results presented in Table 1 shows that because of the introduction of the peroxidic compound it is possible very noticeably to improve the whiteness of the pulp (comparison of Experiment 1R with Experiments 2 to 5).

Comparison of Experiments 2, 3 and 4 shows that an increase in density of the pulp permitted a slight improvement in whiteness. Comparison of Experiments 3 and 5 shows that for a given consistency of the pulp, the introduction of sodium poly-alpha-hydroxyacrylate makes it possible to gain several points in whiteness.

EXAMPLE 6

Two series of experiments were carried out, respectively under the same conditions as Experiments 2 and 5, with varying pulp consistencies. The working consistency is between 22 and 45%.

The results obtained are summarised in the attached FIG. 1, which shows the variation in whiteness, expressed in % MgO (Y) as a function of the consistency expressed in % (X).

Examination of FIG. 1 shows the favourable influence of the sodium poly-alpha-hydroxyacrylate on the whiteness. Examination of FIG. 1 shows that using pulp consistencies greater than 20% and preferably between 22 and 45%, an appreciable gain in whiteness is achieved, in spite of a rather small amount of reactants employed.

We claim:

1. In a process for the regeneration of waste paper which comprises the disintegration of the waste paper in a disintegrator directly fed from dry waste paper and functioning with a pulp consistency, at the disintegrator outlet, of between 22 and 45%, in the presence of an aqueous phase, the improvement wherein at least one peroxidic bleaching agent in an amount between 0.1 and 5% by weight of the weight of the dry waste paper is introduced into the disintegrator at the same time.

2. Process according to claim 1 wherein in that the bleaching agent is hydrogen peroxide.

3. Process according to claim 1 wherein in that the bleaching agent is sodium peroxide.

4. Process according to claim 1 wherein in that the pulp consistency, at the disintegrator outlet, is between 25 and 40%.

5. Process according to claim 1 wherein in that at least part of the aqueous phase is in a liquid form.

6. Process according to claim 1 wherein in that at least part of the aqueous phase in the form of steam.

7. Process according to claim 1 wherein in that at least one alkaline compound is also introduced into the disintegrator.

8. Process according to claim 7 wherein the alkaline compound is selected from the group consisting of the hydroxides, the carbonates, the silicates of alkali metals and their mixtures.

9. Process according to claim 8 wherein the alkaline compound is selected from the group consisting of the hydroxide, carbonate, the silicate of sodium and their mixtures.

10. Process according to claim 9 wherein in that the alkaline compound is sodium hydroxide.

11. Process according to claim 7 wherein in that the amount of the alkaline compound used is of 0.2 to 10% by wt. relative to the weight of the dry waste paper.

12. Process according to claim 11 wherein in that the amount of sodium hydroxide used is of 0.1 to 8% in wt. relative to the weight of the dry waste paper.

13. Process according to claim 1 wherein in that at least one carboxylic polymer is also introduced in the disintegrator.

14. Process according to claim 13 wherein in that the carboxylic polymer is a hydroxycarboxylic polymer.

15. Process according to claim 14 wherein the hydroxycarboxylic polymer contains monomeric units of the formula

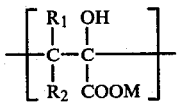

where $R_1$ and $R_2$ represent hydrogen or an alkyl group containing from 1 to 3 carbon atoms which can be substituted by a hydroxyl group or by a halogen atom, and $R_1$ and $R_2$ can be identical or different, and where M represents a substituent selected from the group consisting of hydrogen, an alkali metal and an ammonium group.

16. Process according to claim 15 wherein in that the hydroxycarboxylic polymer is a homopolymer.

17. Process according to claim 16 wherein in that the hydroxycarboxylic polymer is the sodium poly-α-hydroxycarboxylate.

18. Process according to claim 15 wherein in that M represents hydrogen.

19. Process according to claim 18 wherein in that the polymer is employed in a form at least partially lactonised.

20. Process according to claim 19 wherein in that the polymer is the polylactone derived from the poly-α-hydroxyacrylic acid.

21. Process according to claim 14 wherein in that polyacrylic acid is also introduced in the disintegrator.

22. Process according to claim 14 wherein in that sodium polyacrylate is also introduced in the disintegrator.

23. Process according to claim 13 characterised in that the amount of polymer used is of 0.01 to 10% by wt. relative to the weight of the dry waste paper.

24. Process according to claim 1 wherein an alkaline aqueous solution containing:
between 0.1 and 5% by wt. of hydrogen peroxide,
from 0 to 8% by wt. of sodium hydroxide,
from 0 to 10% by wt. of sodium silicate, and
from 0 to 10% by wt. of carboxylic polymers, the percentages being relative to the weight of the dry waste paper, is introduced in the disintegrator.

25. Process according to claim 1 wherein in that the temperature in the disintegrator is 20° to 120° C.

26. Process according to claim 1 wherein the waste paper that is being regenerated contains 0.01 to 10% by weight of a resin which improves the wet strength of the paper.

27. Process according to claim 1, wherein the temperature in the disintegrator is 70° to 95° C.

28. Process according to claim 1, wherein after the disintegration, the inks are removed.

29. Process according to claim 28, wherein the inks are removed by washing.

30. Process according to claim 28, wherein the inks are removed by flotation.

31. Process according to claim 1, wherein the inks are dispersed.

32. Process according to claim 1, wherein the amount of peroxidic bleaching agent is from 0.1 to 3% by weight of the weight of the dry waste paper.

33. In a process for the regeneration of waste paper which comprises the disintegration of waste paper in a disintegrator directly fed with dry waste paper and functioning with a pulp consistency, at the disintegrator outlet, of between 20 and 50%, in the presence of an aqueous phase, the improvement wherein at least one peroxidic bleaching agent selected from the group consisting of hydrogen peroxide and sodium peroxide, in an amount between 0.1 and 5% by weight of the weight of the dry waste paper is introduced into the disintegrator at the same time, at least one alkaline compound is also introduced into the disintegrator, at least part of the aqueous phase is in a liquid form or in the form of steam, the consistency of the pulp at the outlet of the disintegrator is between 22 and 45%, and the temperature in the disintegrator is 70° to 95° C.

* * * * *